US012261373B2

(12) United States Patent
Timofeev et al.

(10) Patent No.: US 12,261,373 B2
(45) **Date of Patent: *Mar. 25, 2025**

(54) DUAL-BEAM SECTOR ANTENNA AND ARRAY

(71) Applicant: Outdoor Wireless Networks LLC, Claremont, NC (US)

(72) Inventors: Igor E. Timofeev, Dallas, TX (US); Martin L. Zimmerman, Chicago, IL (US); Huy Cao, Garland, TX (US); Yanping Hua, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/952,521

(22) Filed: Sep. 26, 2022

(65) Prior Publication Data

US 2023/0018326 A1 Jan. 19, 2023

Related U.S. Application Data

(63) Continuation of application No. 16/998,558, filed on Aug. 20, 2020, now Pat. No. 11,469,497, which is a (Continued)

(51) Int. Cl.

*H01Q 3/00* (2006.01)
*H01Q 1/24* (2006.01)

(Continued)

(52) U.S. Cl.

CPC ............... *H01Q 3/26* (2013.01); *H01Q 1/246* (2013.01); *H01Q 3/30* (2013.01); *H01Q 25/002* (2013.01);

(Continued)

(58) Field of Classification Search

CPC .......... H01Q 3/26; H01Q 3/263; H01Q 3/267; H01Q 3/28; H01Q 3/30; H01Q 3/40; H01Q 25/002; H01Q 25/02; H01Q 1/246

(Continued)

(56) References Cited

U.S. PATENT DOCUMENTS 3,255,450 A 6/1966 Butler
4,584,581 A 4/1986 Teshirogi (Continued)

FOREIGN PATENT DOCUMENTS

AU 2006252225 B2 * 1/2010 ................ H01P 1/18
CN 1540903 A 10/2004

(Continued)

OTHER PUBLICATIONS

Extended European Search Report for corresponding European Patent Application No. 19178267.1, mailed Oct. 5, 2020, 8 pages.

(Continued)

*Primary Examiner* — Chuong P Nguyen
(74) *Attorney, Agent, or Firm* — Myers Bigel, P.A.

(57) ABSTRACT

A low sidelobe beam forming method and dual-beam antenna schematic are disclosed, which may preferably be used for 3-sector and 6-sector cellular communication system. Complete antenna combines 2-, 3- or 4-columns dual-beam sub-arrays (modules) with improved beam-forming network (BFN). The modules may be used as part of an array, or as an independent 2-beam antenna. By integrating different types of modules to form a complete array, the present invention provides an improved dual-beam antenna with improved azimuth sidelobe suppression in a wide frequency band of operation, with improved coverage of a desired cellular sector and with less interference being created with other cells. Advantageously, a better cell effi- (Continued)

ciency is realized with up to 95% of the radiated power being directed in a desired cellular sector.

11 Claims, 10 Drawing Sheets

Related U.S. Application Data continuation of application No. 15/787,782, filed on Oct. 19, 2017, now Pat. No. 10,777,885, which is a continuation of application No. 13/127,592, filed as application No. PCT/US2009/006061 on Nov. 12, 2009, now Pat. No. 9,831,548.

(60) Provisional application No. 61/199,840, filed on Nov. 20, 2008.

(51) Int. Cl.

| | |
|---|---|
| ***H01Q 3/26*** | (2006.01) |
| ***H01Q 3/30*** | (2006.01) |
| ***H01Q 25/00*** | (2006.01) |
| *H01Q 3/28* | (2006.01) |
| *H01Q 3/40* | (2006.01) |
| *H01Q 21/06* | (2006.01) |
| *H01Q 21/24* | (2006.01) |
| *H01Q 25/02* | (2006.01) |

(52) U.S. Cl.

CPC ................ *H01Q 3/28* (2013.01); *H01Q 3/40* (2013.01); *H01Q 21/061* (2013.01); *H01Q 21/24* (2013.01); *H01Q 25/00* (2013.01); *H01Q 25/02* (2013.01)

(58) Field of Classification Search

USPC ................................ 342/373, 374, 380, 383

See application file for complete search history.

(56) References Cited

U.S. PATENT DOCUMENTS

| | | | |
|---|---|---|---|
| 4,638,317 | A | 1/1987 | Evans |
| 5,115,248 | A | 5/1992 | Roederer |
| 5,177,491 | A | 1/1993 | Lopez |
| 5,581,260 | A | 12/1996 | Newman |
| 5,666,655 | A | 9/1997 | Ishikawa et al. |
| 5,686,926 | A | 11/1997 | Kijima et al. |
| 5,907,816 | A | 5/1999 | Newman et al. |
| 5,982,237 | A | 11/1999 | Pax et al. |
| 6,034,649 | A | 3/2000 | Wilson et al. |
| 6,081,233 | A | 6/2000 | Johannisson |
| 6,094,165 | A | 7/2000 | Smith |
| 6,127,972 | A | 10/2000 | Avidor et al. |
| 6,167,036 | A | 12/2000 | Bevan |
| 6,198,434 | B1 | 3/2001 | Martek et al. |
| 6,311,075 | B1 | 10/2001 | Bevan et al. |
| 6,317,100 | B1 | 11/2001 | Elson et al. |
| 6,463,301 | B1 | 10/2002 | Bevan et al. |
| 6,463,303 | B1 | 10/2002 | Zhao |
| 6,480,524 | B1 | 11/2002 | Smith et al. |
| 6,577,879 | B1 | 6/2003 | Hagerman et al. |
| 6,608,591 | B2 * | 8/2003 | Wastberg ............. H01Q 21/065 342/373 |
| 6,771,218 | B1 | 8/2004 | Lalezari et al. |
| 7,038,621 | B2 | 5/2006 | Gabriel et al. |
| 7,098,848 | B2 | 8/2006 | Ksienski et al. |
| 7,102,571 | B2 | 9/2006 | McCarrick |
| 7,327,323 | B2 | 2/2008 | Jackson et al. |
| 7,388,552 | B2 | 6/2008 | Mori |
| 7,400,606 | B2 | 7/2008 | Padovani et al. |
| 7,792,547 | B1 | 9/2010 | Smith et al. |
| 7,817,096 | B2 | 10/2010 | Linehan |
| 8,237,619 | B2 * | 8/2012 | Vassilakis .............. H01Q 19/18 343/836 |
| 8,269,687 | B2 | 9/2012 | Lindmark et al. |
| 8,666,451 | B2 | 3/2014 | Engstrom et al. |
| 9,077,083 | B1 | 7/2015 | Freeman et al. |
| 9,768,494 | B2 | 9/2017 | Johansson et al. |
| 10,033,111 | B2 * | 7/2018 | Timofeev ........... H01Q 21/0075 |
| 10,181,657 | B2 * | 1/2019 | Ai ........................ H01Q 21/061 |
| 10,263,331 | B2 | 4/2019 | Kundtz et al. |
| 10,454,164 | B2 * | 10/2019 | Yoshihara ............ H01Q 9/0435 |
| 10,957,991 | B2 * | 3/2021 | Xiao ...................... H01Q 21/24 |
| 11,418,975 | B2 * | 8/2022 | Firouzbakht ........... H01Q 5/307 |
| 11,581,638 | B2 * | 2/2023 | Ai ........................ H01Q 3/2617 |
| 2002/0021246 | A1 | 2/2002 | Martek et al. |
| 2002/0080073 | A1 | 6/2002 | Wastberg |
| 2004/0038714 | A1 | 2/2004 | Rhodes et al. |
| 2004/0235528 | A1 | 11/2004 | Korisch |
| 2006/0164284 | A1 | 7/2006 | Pauplis et al. |
| 2006/0164299 | A1 | 7/2006 | Shamsaifar et al. |
| 2007/0030208 | A1 | 2/2007 | Linehan |
| 2009/0096702 | A1 | 4/2009 | Vassilakis et al. |
| 2012/0268324 | A1 * | 10/2012 | Vassilakis ................ H01Q 3/40 342/368 |
| 2012/0319900 | A1 | 12/2012 | Johansson et al. |
| 2015/0084832 | A1 | 3/2015 | Ai et al. |
| 2015/0333884 | A1 | 11/2015 | Athley |
| 2020/0295799 | A1 | 9/2020 | Howard |
| 2020/0313294 | A1 | 10/2020 | Morita |
| 2024/0162599 | A1 * | 5/2024 | Bunga .................... H01Q 1/246 |

FOREIGN PATENT DOCUMENTS

| | | | | |
|---|---|---|---|---|
| CN | 1921341 | A | 2/2007 | |
| CN | 2916958 | Y | 6/2007 | |
| CN | 101051860 | A | 10/2007 | |
| CN | 201126857 | Y | 10/2008 | |
| EP | 0895436 | A2 | 2/1999 | |
| JP | 2006066993 | A | 3/2006 | |
| WO | 9960659 | A1 | 11/1999 | |
| WO | 0041450 | A1 | 7/2000 | |
| WO | 0115477 | A1 | 3/2001 | |
| WO | 0241450 | A1 | 5/2002 | |
| WO | 0249150 | A2 | 6/2002 | |
| WO | 02102106 | A1 | 12/2002 | |
| WO | 03043127 | A2 | 5/2003 | |
| WO | 03045094 | A1 | 5/2003 | |
| WO | 2004032393 | A2 | 4/2004 | |
| WO | 2005053182 | A1 | 6/2005 | |
| WO | 2006004463 | A1 | 1/2006 | |
| WO | 2007106989 | A1 | 9/2007 | |
| WO | WO-2007118211 | A2 * | 10/2007 | ................ H01P 1/18 |
| WO | 2010059186 | A2 | 5/2010 | |

OTHER PUBLICATIONS

"Allen, et al.; A Theoretical Limitation on the Formation of Lossless Multiple Beams in Linear Arrays; Antennas and Propagation, IRE Transactions (vol. 9m Iss. 4), 1961".

"Anderson, et al; Adaptive Antennas for GSM and TDMA Systems; IEEE Personal Communications, 1999".

"Balanis, C. et al., "Introduction to Smart Antennas," Morgan & Claypool., 2007".

"Caille et al., Flexible Multi-Beam Active Array Antennas for High-Rate Communication from Satellites, 2005".

"Cantrell et al., Wideband Array Antenna Concept, 2005".

"Communication Pursuant to Article 94(3) EPC, corresponding to European Patent Application No. 19178267.1-1010, mailing date Apr. 29, 2021, 5 pages".

"Defendant Rosenberger Site Solutions, LLC, Rosenberger Asia Pacific Electronic Co., Ltd., Rosenberger Technolgies (Kunshan) Co., Ltd. and Rosenberger Technology LLC's Initial Invalidity Contentions, in litigation entitled CommScope Technologies, LLC. Plai".

"Design of a dual-beam antenna used for base station of cellular mobile radios, Y. Ebine, M. Ito; Electronics and Communications in Japan (Part I: Communications); vol. 80, Issue 12, 1997".

"Dictionary of Electrical and Computer Engineering, McGraw-Hill, Sixth Edition, 2004".

(56) References Cited

OTHER PUBLICATIONS

"Dolph; A Current Distribution for Broadside Arrays Which Optimizes the Relationship Between Beam Width and Side-Lobe Level; Proceedings of the IRE (vol. 34, Iss. 6), 1946".
"Elliott; Design of line source antennas for narrow beamwidth and asymmetric low sidelobes; IEEE Trans. AP, 1975".
"Ericson, et al; Capacity Study for Fixed Multi Beam Antenna Systems in a Mixed Service WCDMA System; IEEE, 2001".
"Examination Report for corresponding European Patent Application No. 09 827 850.0-1568, dated Dec. 12, 2017, 4 pages".
"Feuerstein; Applications of Smart Antennas in Cellular Networks; IEEE Personal Communications, 1999".
"Frank; Phased Array Antenna Development; Johns Hopkins University; Springfield VA, 1967".
"Fujimoto, K. et al., Mobile Antenna Systems Handbook, Artech House, Inc. (Second Edition), 2001".
"Fujimoto, K. et al., Mobile Antenna Systems Handbook, Artech House, Inc. (Third Edition), 2008".
"Hagerman et al. "SCDMA 6—sector Deployment Case Study of a Real Installed UMTS-FDD Network" IEEE, 2006".
"Hagerman, et al.; WCDMA 6-sector Deployment Case Study of a Real Installed UMTS-FDD Network; IEEE, 2006".
"Hall, et al.; Review of Radio Frequency Beamforming Techniques for Scanned and Multiple Beam Antennas; Microwaves, Antennas and Propagation IEE Proceedings H (vol. 137, Iss. 5), 1990".
"Ilcev, S., "Antenna Systems for Mobile Satellite Applications," Durban University of Technology., 2005".
"Johnson; Antenna Engineering Handbook, 3rd Ed. McGraw Hill, 1993".
"Kalinichev; Analysis of Beam-Steering and Directive Characteristics of Adaptive Antenna Arrays for Mobile Communications; IEEE Antennas and Propagation Magazine, vol. 43, No. 3, 2001".
"Kaplan, S., Wiley Electrical and Electronics Engineering Dictionary, John Wiley & Sons, Inc., 2004".
"Kraus, J., Electromagnetics, McGraw-Hill, Inc. (4th Edition), 1991".
"Lin, et al; Performance of an Angle-of-Arrival Estimator in the Presence of a Mainbeam Interference Source; Navel Research Laboratory; Washington, DC NRL Report 9345, 1941".
"Martinez-Munoz; Nortel Networks CDMA Advantages of AABS Smart Antenna Technology for CDG; Presentation Nortel Networks, 2002".
"Navel Air Systems Command; Electronic Warfare and Radar Systems Engineering Handbook; Point Mugu, CA, 1999".
"Osseiran et al., "Impact of Angular Spread on Higher Order Sectorization in WCDMA Systems," 2005 IEEE 16th International Symposium on Personal, Indoor and Mobile Radio Communications, 2005".
"Osseiran et al., "Smart Antennas in a WCDMA Radio Network System: Modeling and Evaluations," IEEE Transaction on Antennas and Propagation, vol. 54, No. 11, 2006".
"Osseiran et al.; Downlink Capacity Comparison between Different Smart Antenna Concepts in a Mixed Service MCDMA System, 2001".
"Osseiran et al.; System Performance of Transmit Diversity Methods and a Two Fixed-Beam System in WCDMA; Wireless Personal Communications 31-33-50, 2004".
"Osseiran; Advanced Antennas in Wireless Communications; Doctoral Thesis; Royal Institute of Technology; Stockholm, Sweden, 2006".
"Osseiran; et al.; A Method for Designing Fixed Multibeam Antenna Arrays in WCDMA Systems; IEEE Antennas and Wireless Propagation Letters, vol. 5, 2006".
"Osseiran; et al.; Osseiran; et al.; On Downlink Admission Control with Fixed Multi-Beam Antennas for WCDMA System, VTC Spring 2003".
"Pattan, Bruno "The Versatile Butler Matrix," Microwave Journal, 2004".
"Pedersen, et al.; Application and Performance of Downlink Beamforming Techniques in UMTS; IEEE Communications Magazine, 2003".
"Saunders; Antennas and Propagation for Wireless Communication Systems; Wiley, 1999, New York, 1999".
"Schuman; Minimizing the Number of Control Elements in Phased Arrays by Subarraying; IEEE, 1988".
"Standards Coordinating Committee 10, The IEEE Standard Dictionary of Electrical and Electronics Terms, IEEE Std 100 (6th Edition), 1996".
"Taylor, et al.; Design of Line-Source Antennas for Narrow Beamwidth and Low Side Lobes; Antennas and Propagation, (vol. 3 Iss. 1), 1955".
"TENXC Wireless; Higher Capacity Through Multiple Beams Using Asymmetric Azimuth Arrays; Presentation given at CDG Technology Forum, 2006".
"Thornton; A Low Sidelobe Asymmetric Beam Antenna for High Altitude Platform Communications; IEEE Microwave and Wireless Components Letters, vol. 14, No. 2, 2004".
"Translation of Examination Report in corresponding Indian Patent Application No. 3562/CHENP/2011 (5 pages)".
"Van Veen et al.; Beamforming: A Versatile Approach to Spatial Filtering; IEEE ASSP Magazine, 1988".
"Wacker, et al.; The Impact of the Base Station Sectorisation on WCDMA Radio Network Performance; Proceeding of the IEEE Vehicular Communications Technology Conference, VTC 1999, Houston, Texas, May 1999".
"Zetterberg; Performance of Three, Six, Nine and Twelve Sector Sites in CDMA-Based on Measurements; Royal Institute of Technology; Stockholm; IEEE, 2004".
Abd Almhamoud, Mohammad Musa , "Experimental Evaluation of RF Emission levels around some Selected Base Stations", Thesis for the Fulfillment of the Requirement of the Degree of M.SC, Electrical and Electronic Engineering Communication Division., 2008.
Cheston, T.C. , et al., "Time-delay feed architectures for active scanned arrays", IEEE Antennas and Propagation Society International Symposium. 1996 Digest, 1996, 1620-1623.

* cited by examiner

136

140

DUAL-BEAM SECTOR ANTENNA AND ARRAY

CLAIM OF PRIORITY

This application is a continuation of U.S. patent application Ser. No. 16/998,558, filed Aug. 20, 2020, which, in turn is a continuation of Ser. No. 15/787,782, filed Oct. 19, 2017, which, in turn, is a continuation of Ser. No. 13/127,592, filed May 4, 2011, which is a 35 U.S.C. § 371 national stage application of PCT international application No. PCT/US2009/006061, filed Nov. 12, 2009 (published as WO 2010/059186 on May 27, 2010), which itself claims priority of Provisional Application U.S. Ser. No. 61/199,840, filed on Nov. 20, 2008 entitled Dual-Beam Antenna Array, the disclosures and contents of which are incorporated herein by reference in their entireties.

FIELD OF THE INVENTION

The present invention is generally related to radio communications, and more particularly to multi-beam antennas utilized in cellular communication systems.

BACKGROUND OF THE INVENTION

Cellular communication systems derive their name from the fact that areas of communication coverage are mapped into cells. Each such cell is provided with one or more antennas configured to provide two-way radio/RF communication with mobile subscribers geographically positioned within that given cell. One or more antennas may serve the cell, where multiple antennas commonly utilized and each are configured to serve a sector of the cell. Typically, these plurality of sector antennas are configured on a tower, with the radiation beam(s) being generated by each antenna directed outwardly to serve the respective cell.

In a common 3-sector cellular configuration, each sector antenna usually has a 65° 3 dB azimuth beamwidth (AzBW). In another configuration, 6-sector cells may also be employed to increase system capacity. In such a 6-sector cell configuration, each sector antenna may have a 33° or 45° AzBW as they are the most common for 6-sector applications. However, the use of 6 of these antennas on a tower, where each antenna is typically two times wider than the common 65° AzBW antenna used in 3-sector systems, is not compact, and is more expensive.

Dual-beam antennas (or multi-beam antennas) may be used to reduce the number of antennas on the tower. The key of multi-beam antennas is a beamforming network (BFN). A schematic of a prior art dual-beam antenna is shown in FIG. 1A and FIG. 1B. Antenna 11 employs a 2×2 BFN 10 having a 3 dB 90° hybrid coupler shown at 12 and forms both beams A and B in azimuth plane at signal ports 14 (2×2 BFN means a BFN creating 2 beams by using 2 columns). The two radiator coupling ports 16 are connected to antenna elements also referred to as radiators, and the two ports 14 are coupled to the phase shifting network, which is providing elevation beam tilt (see FIG. 1B). The main drawback of this prior art antenna as shown in FIG. 1C is that more than 50% of the radiated power is wasted and directed outside of the desired 60° sector for a 6-sector application, and the azimuth beams are too wide (150°@−10 dB level), creating interference with other sectors, as shown in FIG. 1D. Moreover, the low gain, and the large backlobe (about −11 dB), is not acceptable for modern systems due to high interference generated by one antenna into the unintended cells. Another drawback is vertical polarization is used and no polarization diversity.

In other dual-beam prior art solutions, such as shown in U.S. Patent application U.S. 2009/0096702 A1, there is shown a 3 column array, but which array also still generates very high sidelobes, about −9 dB.

Therefore, there is a need for an improved dual-beam antenna with improved azimuth sidelobe suppression in a wide frequency band of operation, having improved gain, and which generates less interference with other sectors and better coverage of desired sector.

SUMMARY OF INVENTION

The present invention achieves technical advantages by integrating different dual-beam antenna modules into an antenna array. The key of these modules (sub-arrays) is an improved beam forming network (BFN). The modules may advantageously be used as part of an array, or as an independent antenna. A combination of 2×2, 2×3 and 2×4 BFNs in a complete array allows optimizing amplitude and phase distribution for both beams. So, by integrating different types of modules to form a complete array, the present invention provides an improved dual-beam antenna with improved azimuth sidelobe suppression in a wide frequency band of operation, with improved coverage of a desired cellular sector and with less interference being created with other cells. Advantageously, a better cell efficiency is realized with up to 95% of the radiated power being directed in a desired sector. The antenna beams' shape is optimized and adjustable, together with a very low sidelobes/backlobes.

In one aspect of the present invention, an antenna is achieved by utilizing a MXN BFN, such as a 2×3 BFN for a 3 column array and a 2×4 BFN for a 4 column array, where M N.

In another aspect of the invention, 2 column, 3 column, and 4 column radiator modules may be created, such as a 2×2, 2×3, and 2×4 modules. Each module can have one or more dual-polarized radiators in a given column. These modules can be used as part of an array, or as an independent antenna.

In another aspect of the invention, a combination of 2×2 and 2×3 radiator modules are used to create a dual-beam antenna with about 35 to 55° AzBW and with low sidelobes/backlobes for both beams.

In another aspect of the invention, a combination of 2×3 and 2×4 radiator modules are integrated to create a dual-beam antenna with about 25 to 45° AzBW with low sidelobes/backlobes for both beams.

In another aspect of the invention, a combination of 2×2, 2×3 and 2×4 radiator modules are utilized to create a dual-beam antenna with about 25 to 45° AzBW with very low sidelobes/backlobes for both beams in azimuth and the elevation plane.

In another aspect of the invention, a combination of 2×2 and 2×4 radiator modules can be utilized to create a dual-beam antenna.

All antenna configurations can operate in receive or transmit mode.

DETAILED DESCRIPTION OF THE PREFERRED EMBODIMENT

Figure 2A:
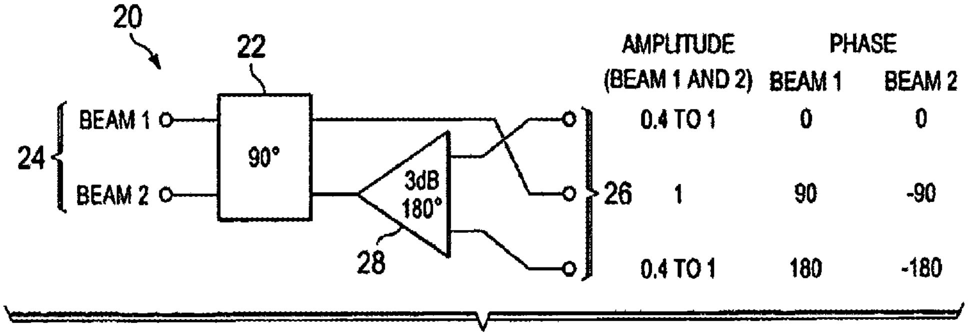
FIG. 2A shows a 2×3 BFN according to one embodiment of the present invention which forms 2 beams with 3 columns of radiators.

Referring now to FIG. 2A, there is shown one preferred embodiment comprising a bidirectional 2×3 BFN at 20 configured to form 2 beams with 3 columns of radiators, where the two beams are formed at signal ports 24. A 90° hybrid coupler 22 is provided, and may or may not be a 3 dB coupler. Advantageously, by variation of the splitting coefficient of the 90° hybrid coupler 22, different amplitude distributions of the beams can be obtained for radiator coupling ports 26: from uniform (1-1-1) to heavy tapered (0.4-1-0.4). With equal splitting (3 dB coupler) 0.7-1-0.7 amplitudes are provided. So, the 2×3 BFN 20 offers a degree of design flexibility, allowing the creation of different beam shapes and sidelobe levels. The 90° hybrid coupler 22 may be a branch line coupler, Lange coupler, or coupled line coupler. The wide band solution for a 180° equal splitter 28 can be a Wilkinson divider with a 180° Shiffman phase shifter. However, other dividers can be used if desired, such as a rat-race 180° coupler or 90° hybrids with additional phase shift. In FIG. 2A, the amplitude and phase distribution on radiator coupling ports 26 for both beams Beam 1 and Beam 2 are shown to the right. Each of the 3 radiator coupling ports 26 can be connected to one radiator or to a column of radiators, as dipoles, slots, patches etc. Radiators in column can be a vertical line or slightly offset (staggered column).

Figure 2B:
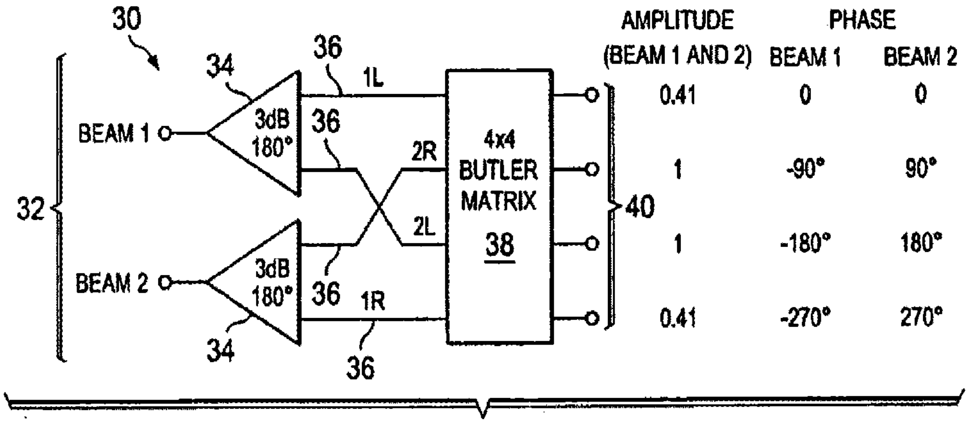
FIG. 2B is a schematic diagram of a 2×4 BFN, which forms 2 beams with 4 columns of radiators, including the associated phase and amplitude distribution for both beams.

FIG. 2B is a schematic diagram of a bidirectional 2×4 BFN 30 according to another preferred embodiment of the present invention, which is configured to form 2 beams with 4 columns of radiators and using a standard Butler matrix 38 as one of the components. The 180° equal splitter 34 is the same as the splitter 28 described above. The phase and amplitudes for both beams Beam 1 and Beam 2 are shown in the right hand portion of the figure. Each of 4 radiator coupling ports 40 can be connected to one radiator or to column of radiators, as dipoles, slots, patches etc. Radiators in column can stay in vertical line or to be slightly offset (staggered column).

Figure 2C:
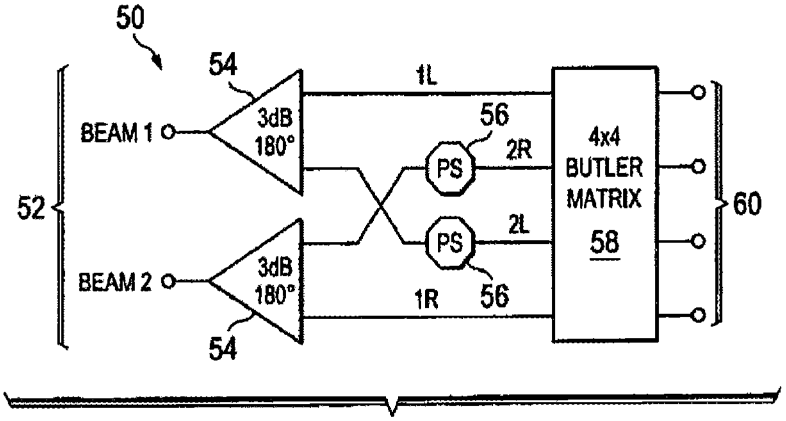
FIG. 2C is a schematic diagram of a 2×4 BFN, which forms 2 beams with 4 columns of radiators, and further provided with phase shifters allowing slightly different AzBW between beams and configured for use in cell sector optimization.

FIG. 2C is a schematic diagram of another embodiment comprising a bidirectional 2×4 BFN at 50, which is configured to form 2 beams with 4 columns of radiators. BFN 50 is a modified version of the 2×4 BFN 30 shown in FIG. 2B, and includes two phase shifters 56 feeding a standard 4×4 Butler Matrix 58. By changing the phase of the phase shifters 56, a slightly different AzBW between beams can be selected (together with adjustable beam position) for cell sector optimization. One or both phase shifters 56 may be utilized as desired.

The improved BFNs 20, 30, 50 can be used separately (BFN 20 for a 3 column 2-beam antenna and BFN 30, 50 for 4 column 2-beam antennas). But the most beneficial way to employ them is the modular approach, i.e. combinations of the BFN modules with different number of columns/different BFNs in the same antenna array, as will be described below.

Figure 1A:
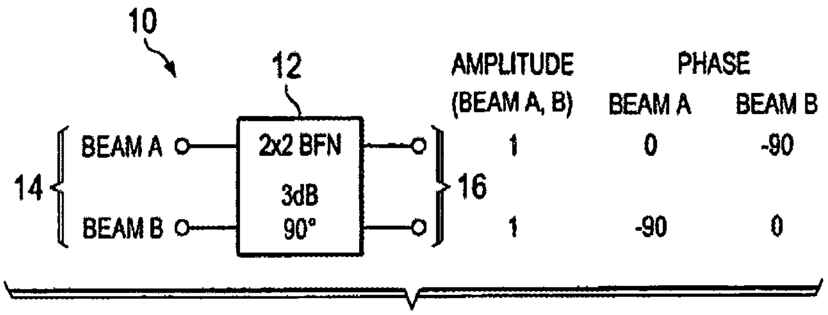
FIG. 1A (PRIOR ART)
FIGS. 1A, 1B, 1C and 1D shows a conventional dual-beam antenna with a conventional 2×2 BFN.
Figure 1B:
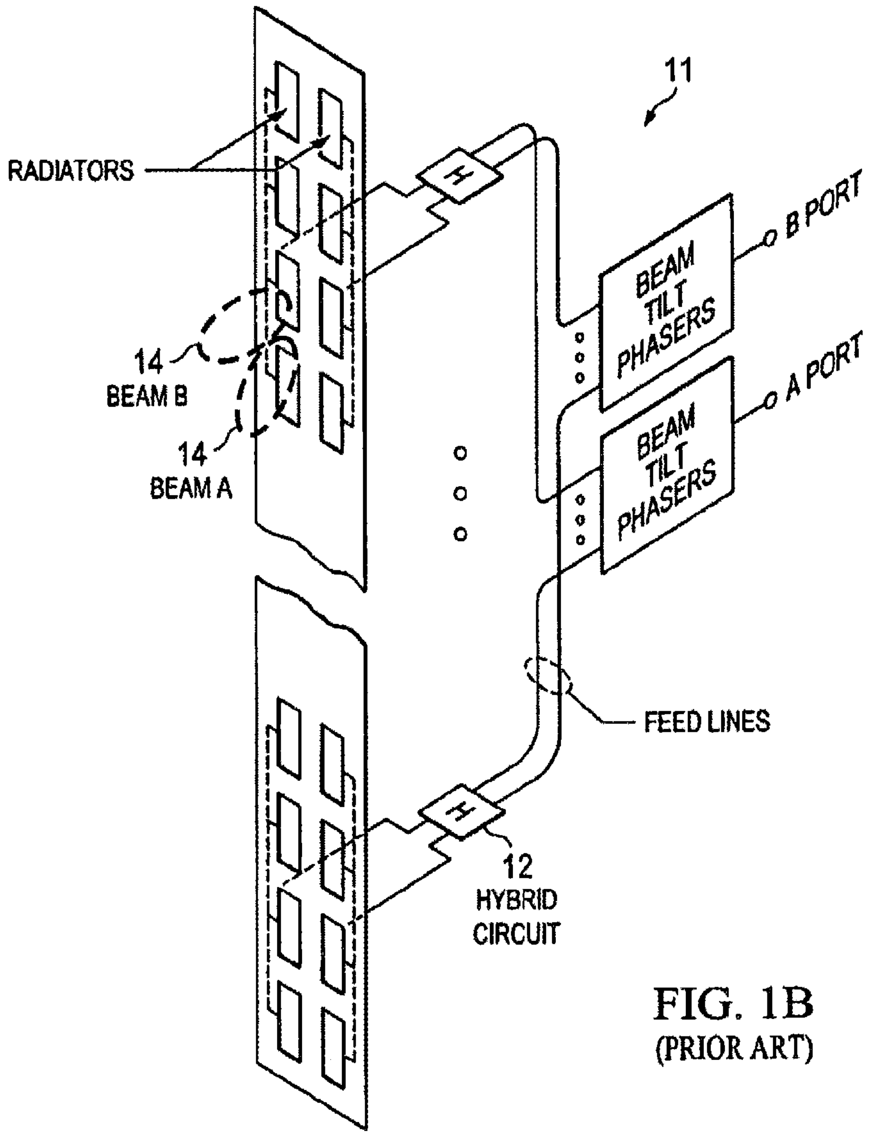
FIG. 1B (PRIOR ART)
Figure 1C:
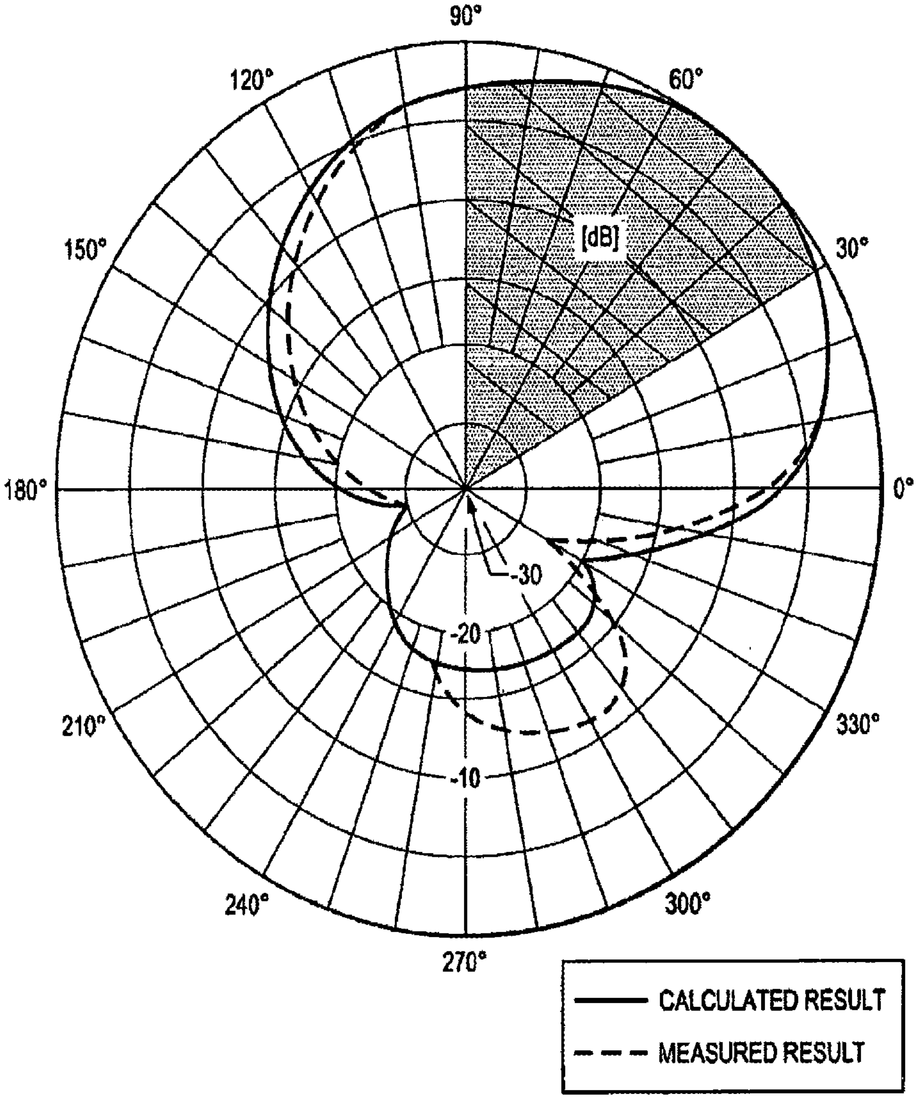
FIG. 1C (PRIOR ART)
Figure 1D:
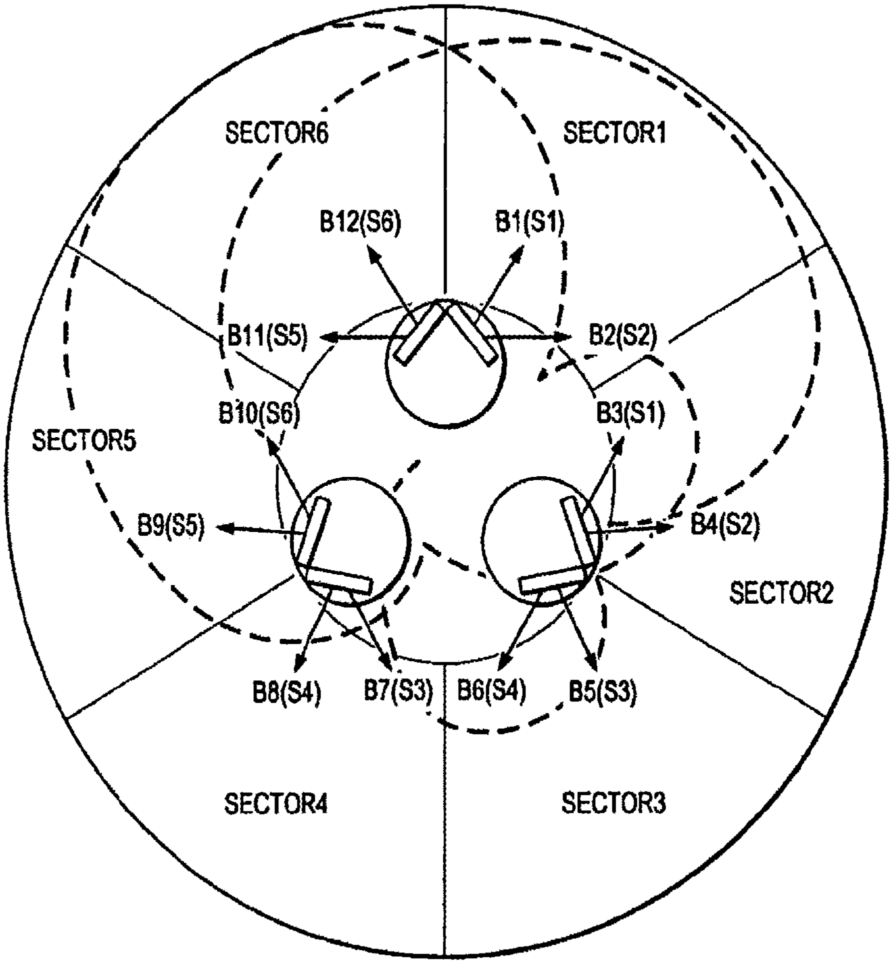
FIG. 1D (PRIOR ART)
Figure 3:
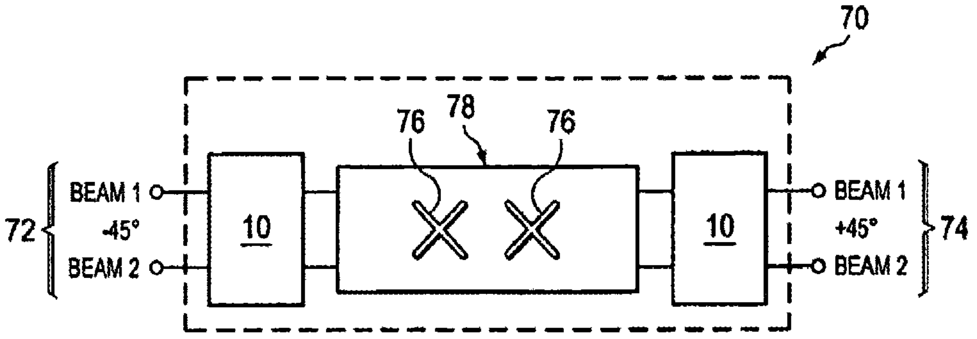
FIG. 3 illustrates how the BFNs of FIG. 1A can be advantageously combined in a dual polarized 2 column antenna module.

FIG. 3 shows a dual-polarized 2 column antenna module with 2×2 BFN's generally shown at 70. 2×2 BFN 10 is the same as shown in FIG. 1A. This 2×2 antenna module 70 includes a first 2×2 BFN 10 forming beams with −45° polarization, and a second 2×2 BFN 10 forming beams with +45° polarization, as shown. Each column of radiators 76 has at least one dual polarized radiator, for example, a crossed dipole.

Figure 4:
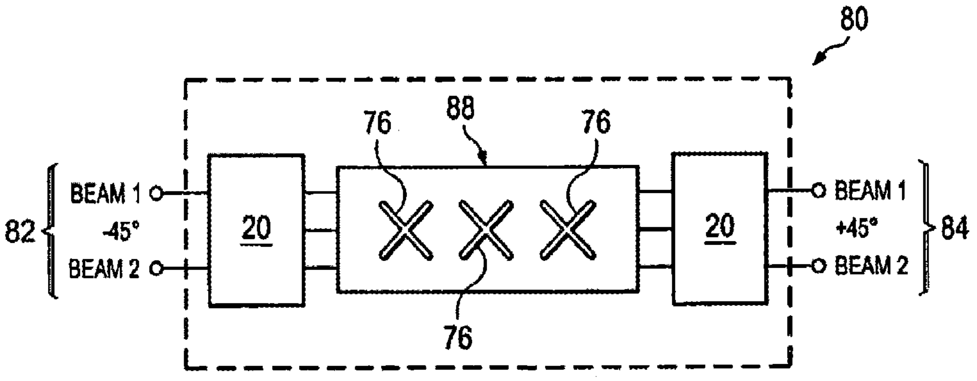
FIG. 4 shows how the BFN of FIG. 2A can be combined in a dual polarized 3 column antenna module.

FIG. 4 shows a dual-polarized 3 column antenna module with 2×3 BFN's generally shown at 80. 2×3 BFN 20 is the same as shown in FIG. 2A. This 2×3 antenna module 80 includes a first 2×3 BFN 20 forming beams with −45° polarization, and a second 2×3 BFN 20 forming beams with +45° polarization, as shown. Each column of radiators 76 has at least one dual polarized radiator, for example, a crossed dipole.

Figure 5:
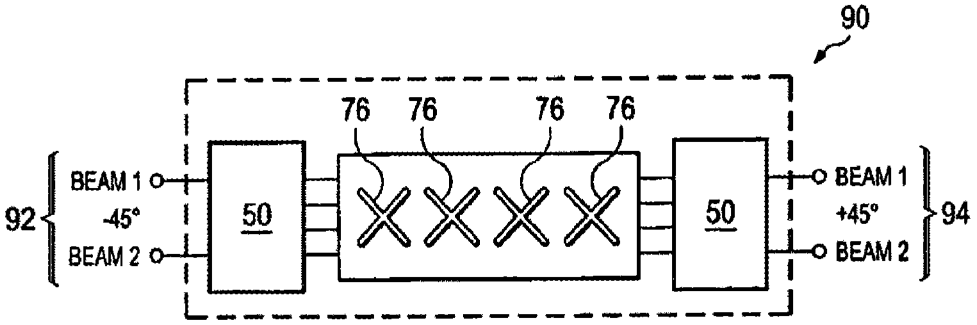
FIG. 5 shows how the BFNs of FIG. 2B or FIG. 2C can be combined in dual polarized 4 column antenna module.

FIG. 5 shows a dual-polarized 4 column antenna module with 2×4 BFN's generally shown at 90. 2×4 BFN 50 is the same as shown in FIG. 2C. This 2×4 antenna module 80 includes a first 2×4 BFN 50 forming beams with −45° polarization, and a second 2×4 BFN 50 forming beams with +45° polarization, as shown. Each column of radiators 76 has at least one dual polarized radiator, for example, a crossed dipole.

Below, in FIGS. 6-10, the new modular method of dual-beam forming will be illustrated for antennas with 45 and 33 deg., as the most desirable for 5-sector and 6-sector applications.

Figure 6:
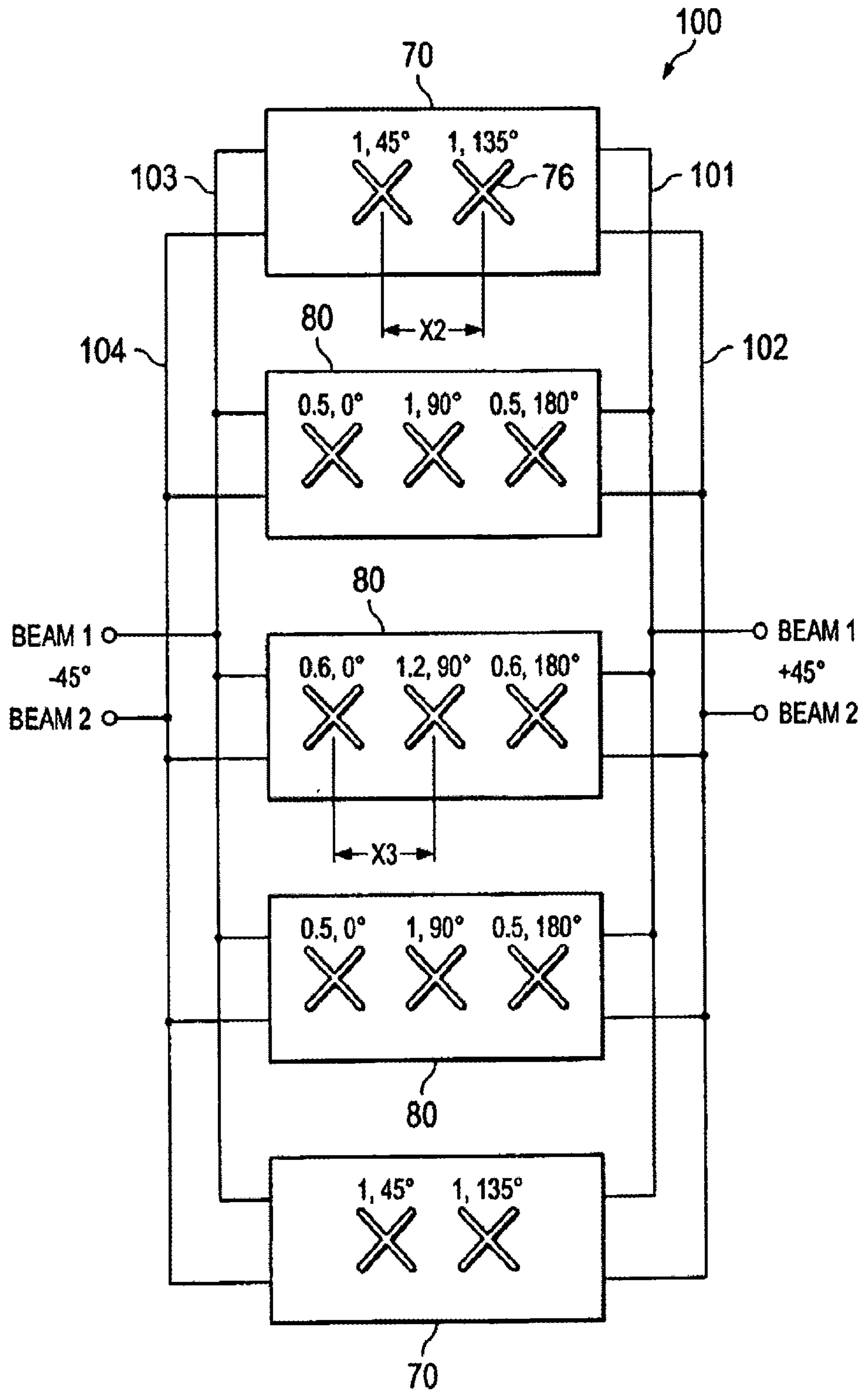
FIG. 6 shows one preferred antenna configuration employing the modular approach for 2 beams each having a 45° AzBW, as well as the amplitude and phase distribution for the beams as shown near the radiators.

Referring now to FIG. 6, there is generally shown at 100 a dual polarized antenna array for two beams each with a 45° AzBW. The respective amplitudes and phase for one of the beams is shown near the respective radiators 76. The antenna configuration 100 is seen to have 3 2×3 modules 80 s and two 2×2 modules 70. Modules are connected with four vertical dividers 101, 102, 103, 104, having 4 ports which are related to 2 beams with +45° polarization and 2 beams with −45° polarization, as shown in FIG. 6. The horizontal spacing between radiators columns 76 in module 80 is X3, and the horizontal spacing between radiators in module 70 is X2. Preferably, dimension X3 is less than dimension X2, X3<X2. However, in some applications, dimension X3 may equal dimension X2, X3=X2, or even X3>X2, depending on the desired radiation pattern. Usually the spacings X2 and X3 are close to half wavelength (λ/2), and adjustment of the spacings provides adjustment of the resulting AzBW. The splitting coefficient of coupler 22 was selected at 3.5 dB to get low Az sidelobes and high beam cross-over level of 3.5 dB.

Figure 7A:
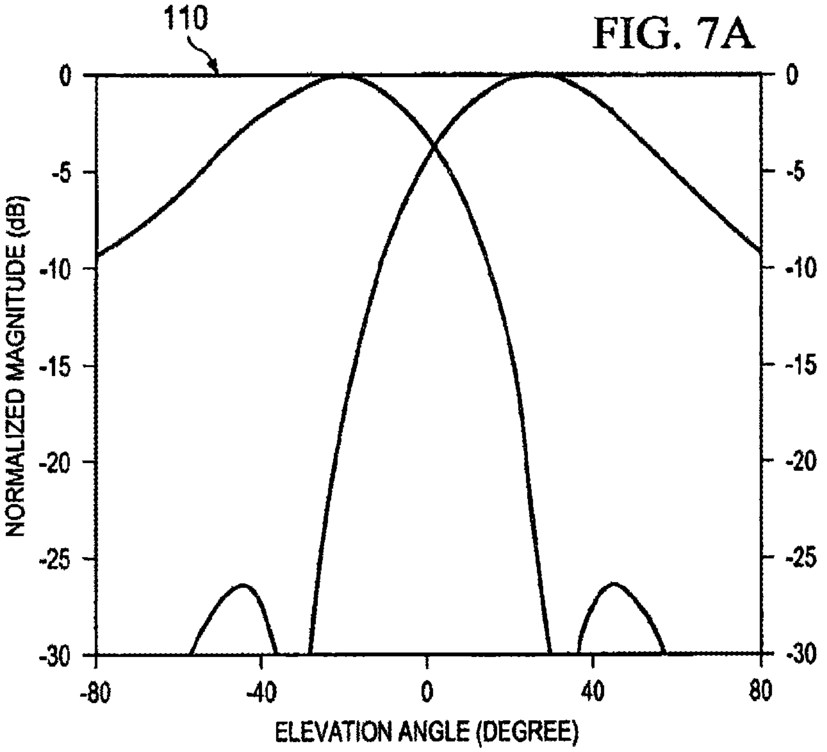
FIG. 7A and FIG. 7B show the synthesized beam pattern in azimuth and elevation planes utilizing the antenna configuration shown in FIG. 6.
Figure 7B:
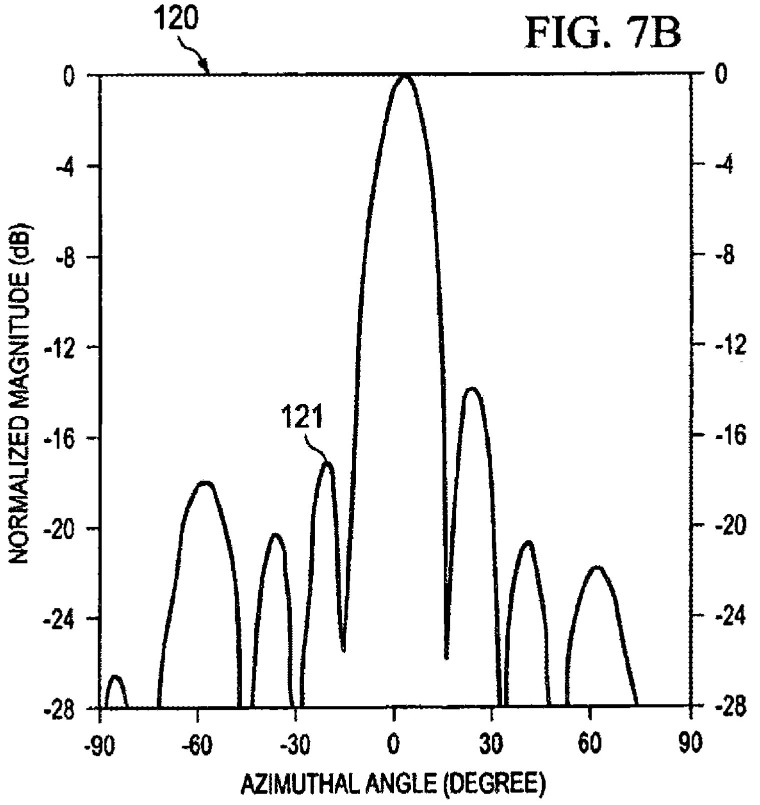

Referring to FIG. 7A, there is shown at 110 a simulated azimuth patterns for both of the beams provided by the antenna 100 shown in FIG. 6, with X3=X2 =0.46λ and 2 crossed dipoles in each column 76, separated by 0.87λ As shown, each azimuth pattern has an associated sidelobe that is at least −27 dB below the associated main beam with beam cross-over level of −3.5 dB. Advantageously, the present invention is configured to provide a radiation pattern with low sidelobes in both planes. As shown in FIG. 7B, the low level of upper sidelobes 121 is achieved also in the elevation plane (<−17 dB, which exceeds the industry standard of <−15 dB). As it can be seen in FIG. 6, the amplitude distribution and the low sidelobes in both planes are achieved with small amplitude taper loss of 0.37 dB. So, by selection of a number of 2×2 and 2×3 modules, distance X2 and X3 together with the splitting coefficient of coupler 22, a desirable AzBW together with desirable level of sidelobes is achieved. Vertical dividers 101, 102, 103, 104 can be combined with phase shifters for elevation beam tilting.

Figure 8A:
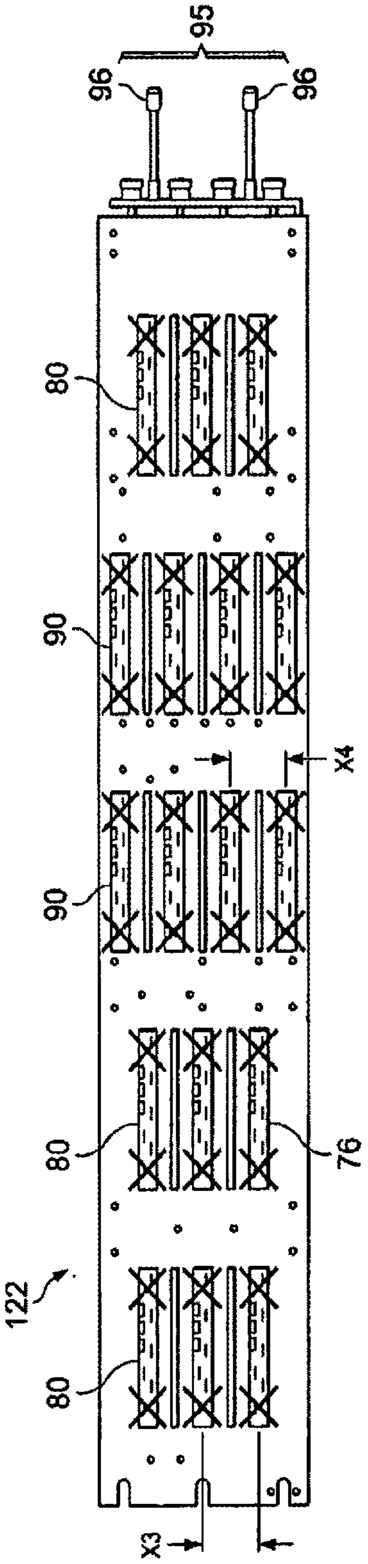
FIGS. 8A and 8B depicts a practical dual-beam antenna configuration when using 2×3 and 2×4 modules.

FIG. 8A depicts a practical dual-beam antenna configuration for a 33° C. AzBW, when viewed from the radiation side of the antenna array, which has three (3) 3-column radiator modules 80 and two (2) 4-column modules 90. Each column 76 has 2 crossed dipoles. Four ports 95 are associated with 2 beams with +45 degree polarization and 2 beams with −45 degree polarization.

Figure 8B:
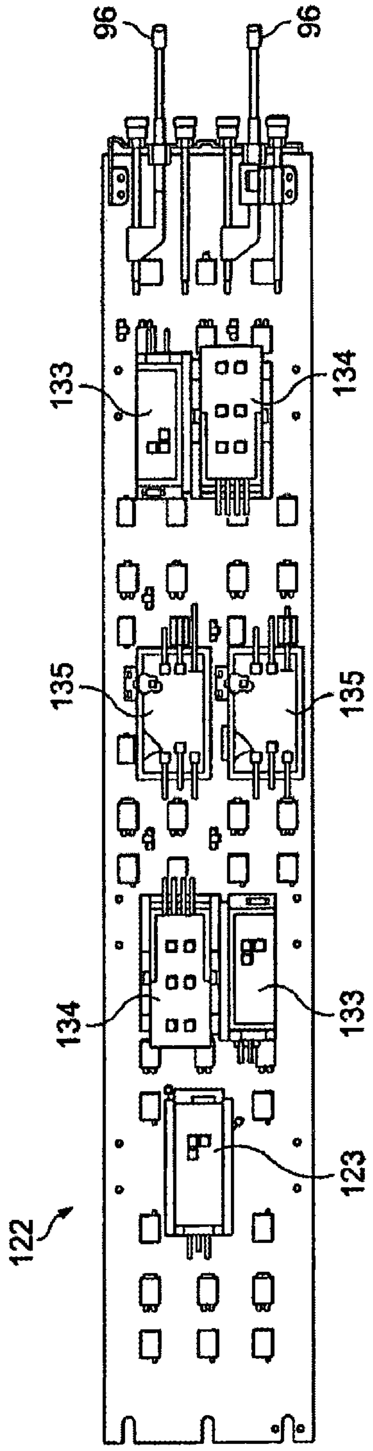

FIG. 8B shows antenna 122 when viewing the antenna from the back side, where 2×3 BFN 133 and 2×4 BFN 134 are located together with associated phase shifters/dividers 135. Phase shifters/dividers 135, mechanically controlled by rods 96, provide antenna 130 with independently selectable down tilt for both beams.

Figure 9:
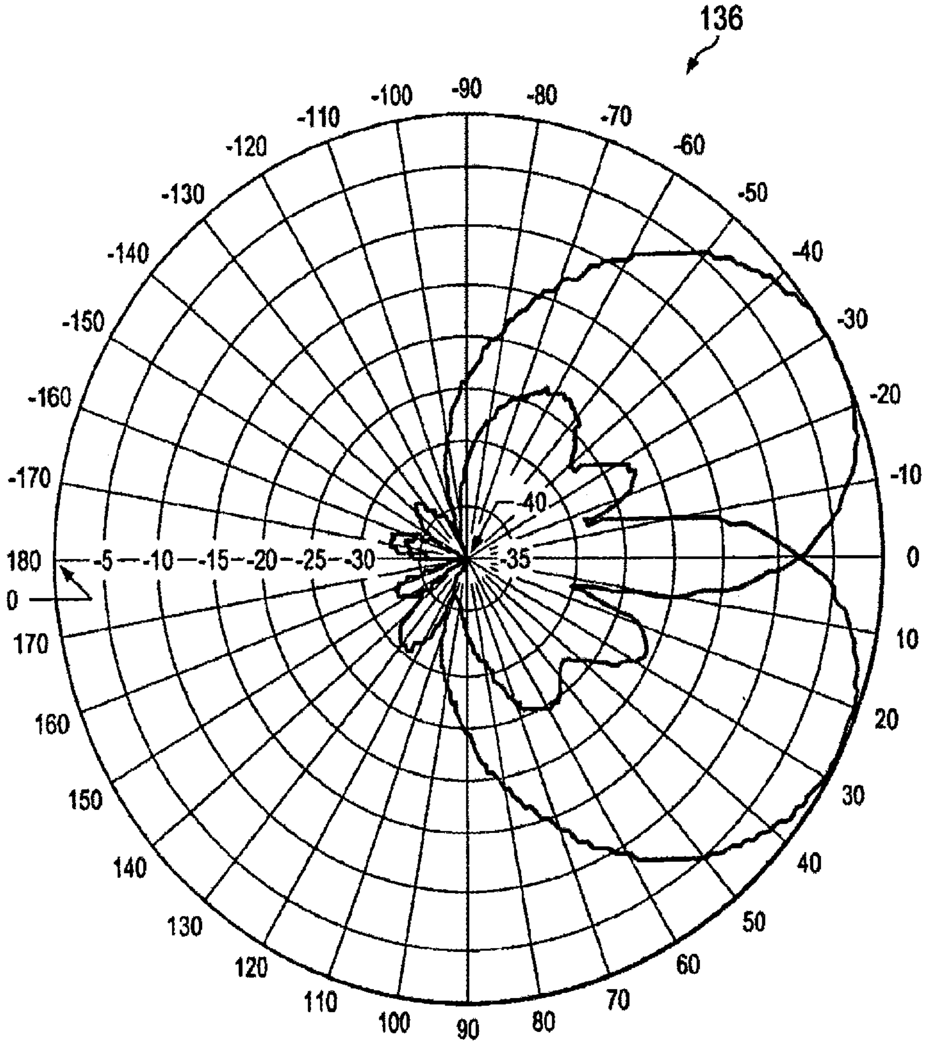
FIGS. 9-10 show the measured radiation patterns with low sidelobes for the configuration shown in FIG. 8A and FIG. 8B.

FIG. 9 is a graph depicting the azimuth dual-beam patterns for the antenna array 122 shown in FIG. 8A, 8B, measured at 1950 MHz and having 33 degree AzBW.

Figure 10:
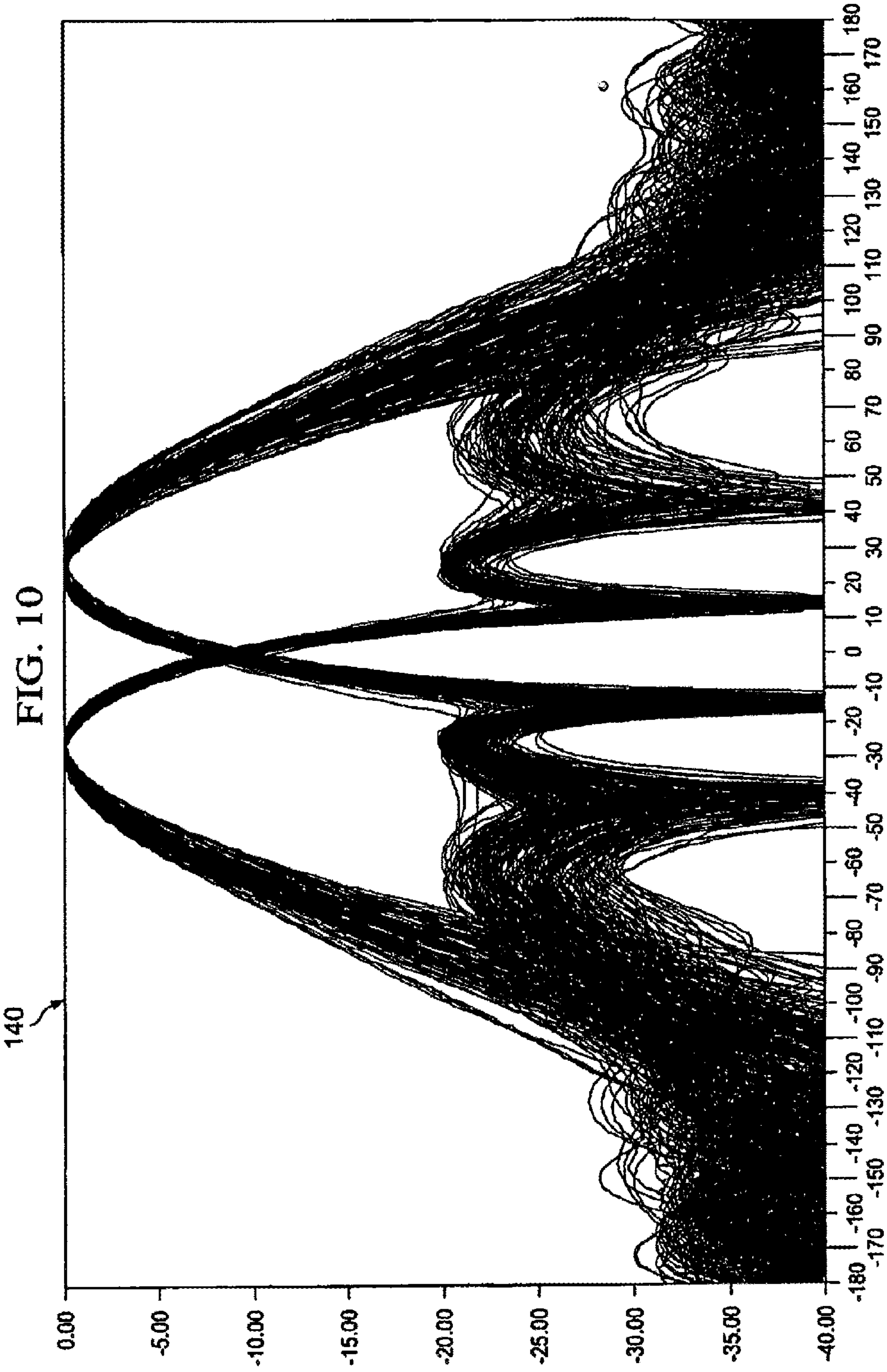

Referring to FIG. 10, there is shown at 140 the dual beam azimuth patterns for the antenna array 122 of FIG. 8A, 8B, measured in the frequency band 1700-2200 MHz. As one can see from FIGS. 9 and 10, low side lobe level (<20 dB) is achieved in very wide (25%) frequency band. The Elevation pattern has low sidelobes, too (<−18 dB).

As can be appreciated in FIGS. 9 and 10, up to about 95% of the radiated power for each main beam, Beam 1 and Beam 2, is directed in the desired sector, with only about 5% of the radiated energy being lost in the sidelobes and main beam portions outside the sector, which significantly reduces interference when utilized in a sectored wireless cell. Moreover, the overall physical dimensions of the antenna 122 are significantly reduced from the conventional 6-sector antennas, allowing for a more compact design, and allowing these sector antennas 122 to be conveniently mounted on antenna towers. Three (3) of the antennas 122 (instead of six antennas in a conventional design) may be conveniently configured on an antenna tower to serve the complete cell, with very little interference between cells, and with the majority of the radiated power being directed into the intended sectors of the cell.

For instance, the physical dimensions of 2-beam antenna 122 in FIG. 8A, 8B are 1.3×0.3 m, the same as dimensions of conventional single beam antenna with 33 degree AzBW.

In other designs based on the modular approach of the present invention, other dual-beam antennas having a different AzBW may be achieved, such as a 25, 35, 45 or 55 degree AzBW, which can be required for different applications. For example, 55 and 45 degree antennas can be used for 4 and 5 sector cellular systems. In each of these configurations, by the combination of the 2×2, 2×3 and 2×4 modules, and the associated spacing X2, X3 and X4 between the radiator columns (as shown in FIGS. 6 and 8A), the desired AzBW can be achieved with very low sidelobes and also adjustable beam tilt. Also, the splitting coefficient of coupler 22 provides another degree of freedom for pattern optimization. In the result, the present invention allows to reduce azimuth sidelobes by 10-15 dB in comparison with prior art.

Though the invention has been described with respect to a specific preferred embodiment, many variations and modifications will become apparent to those skilled in the art upon reading the present application. For example, the invention can be applicable for radar multi-beam antennas. The intention is therefore that the appended claims be interpreted as broadly as possible in view of the prior art to include all such variations and modifications.

That which is claimed is:

1. A multi-beam cellular communication antenna, comprising:

an antenna array having a first row of radiating elements that includes at least two radiating elements that are spaced apart from each other in a row direction and a second row of radiating elements that includes at least three radiating elements that are spaced apart from each other in the row direction, the first row separated from the second row in a column direction that is perpendicular to the row direction, wherein adjacent radiating elements in the first row are spaced apart from each other by a first distance in the row direction and adjacent radiating elements in the second row are spaced apart from each other by a second distance in the row direction, the second distance being different from the first distance.

2. The multi-beam cellular communication antenna of claim 1, wherein the second row includes more radiating elements than the first row.

3. The multi-beam cellular communication antenna of claim 1, further comprising a first beamforming network that is coupled to the radiating elements in the first row and a second beamforming network that is coupled to the radiating elements in the second row, the first beamforming network being different from the second beamforming network.

4. The multi-beam cellular communication antenna of claim 3, further comprising first and second signal ports that are each coupled to both the first beamforming network and to the second beamforming network.

5. The multi-beam cellular communication antenna of claim 1, wherein the multi-beam cellular communication antenna is configured to generate simultaneously a first beam that points in a first direction responsive to a first input signal and a second beam that points in a second direction responsive to a second input signal.

6. The multi-beam cellular communication antenna of claim 5, wherein the first beam covers a first sector of a cell of a wireless communication system and the second beam covers a second sector of the cell.

7. A multi-beam cellular communication antenna, comprising:

an antenna array having a first row of radiating elements that includes at least two radiating elements that are spaced apart from each other in a row direction and a second row of radiating elements that includes at least three radiating elements that are spaced apart from each other in the row direction, the second row having a different number of radiating elements than the first row, the first row separated from the second row in a column direction that is perpendicular to the row direction, wherein adjacent radiating elements in the first row are spaced apart from each other by a first distance in the row direction and adjacent radiating elements in the second row are spaced apart from each other by a second distance in the row direction, the second distance being greater than or equal to the first distance.

8. The multi-beam cellular communication antenna of claim 7, wherein the second row has more radiating elements than the first row and the second distance is greater than the first distance.

9. The multi-beam cellular communication antenna of claim 7, wherein the first row has more radiating elements than the second row and the second distance is greater than the first distance.

10. The multi-beam cellular communication antenna of claim 7, wherein the multi-beam cellular communication antenna is configured to generate simultaneously a first beam that points in a first direction responsive to a first input signal and a second beam that points in a second direction responsive to a second input signal.

11. The multi-beam cellular communication antenna of claim 10, wherein the first beam covers a first sector of a cell of a wireless communication system and the second beam covers a second sector of the cell.

* * * * *